(12) United States Patent
Cabrera

(10) Patent No.: US 10,799,733 B1
(45) Date of Patent: Oct. 13, 2020

(54) FIREFIGHTING HELICOPTER FANS

(71) Applicant: Juan Cabrera, Bronx, NY (US)

(72) Inventor: Juan Cabrera, Bronx, NY (US)

(*) Notice: Subject to any disclaimer, the term of this patent is extended or adjusted under 35 U.S.C. 154(b) by 452 days.

(21) Appl. No.: 15/895,014

(22) Filed: Feb. 13, 2018

(51) Int. Cl.
*B64C 25/52* (2006.01)
*A62C 3/02* (2006.01)
*B64C 27/82* (2006.01)
*B64C 27/06* (2006.01)

(52) U.S. Cl.
CPC .......... *A62C 3/0207* (2013.01); *B64C 25/52* (2013.01); *B64C 27/06* (2013.01); *B64C 27/82* (2013.01)

(58) Field of Classification Search
CPC ....... A62C 3/0207; B64C 27/28; B64C 27/52; B64C 27/82
See application file for complete search history.

(56) References Cited

U.S. PATENT DOCUMENTS

| | | | | |
|---|---|---|---|---|
| 2,891,624 A * | 6/1959 | McBride | ............... | A62C 3/0207 169/44 |
| 3,426,982 A * | 2/1969 | Markwood | ........... | B64C 39/026 244/7 C |
| 4,886,233 A | 12/1989 | Bateman | | |
| 5,205,711 A | 4/1993 | Raczykowski | | |
| 6,446,731 B1 | 9/2002 | Sorosky | | |
| 6,688,402 B1 * | 2/2004 | Wise | ..................... | A62C 3/0207 169/12 |
| D524,718 S | 7/2006 | Scott | | |
| 7,823,827 B2 * | 11/2010 | Piasecki | ................. | B64C 27/28 244/17.19 |
| D695,205 S | 12/2013 | Guzman | | |
| 9,045,226 B2 * | 6/2015 | Piasecki | ................. | B64C 25/58 |
| 9,272,778 B2 * | 3/2016 | Eglin | ..................... | B64C 27/04 |
| 9,315,263 B2 | 4/2016 | Cacciaguerra | | |
| 9,441,641 B1 | 9/2016 | Criswell | | |
| 10,507,905 B2 * | 12/2019 | Bihel | ..................... | B64C 27/28 |
| 10,562,618 B2 * | 2/2020 | Robertson | ................ | B64C 9/04 |
| 2002/0088898 A1 * | 7/2002 | Lucy | ........................ | B64D 1/16 244/17.11 |
| 2009/0216392 A1 * | 8/2009 | Piasecki | ................. | B64C 27/82 701/3 |
| 2010/0218960 A1 * | 9/2010 | Dillman | ................ | A62C 27/00 169/45 |
| 2019/0031371 A1 * | 1/2019 | Ross | ........................ | B64C 1/00 |

FOREIGN PATENT DOCUMENTS

EP     2258615     7/2013

* cited by examiner

*Primary Examiner* — Brian M O'Hara
*Assistant Examiner* — Michael B. Kreiner

(57) ABSTRACT

The firefighting helicopter fans comprise a left pivoting cowled fan and a right pivoting cowled fan mounted onto the sides of a helicopter. The fans may be used to create an airstream, which counters the prevailing wind and/or blows flames and embers away from unburned materials. The fans are each protected by a cowl that surrounds the blades to protect the blades and direct the airstream. The left pivoting cowled fan and the right pivoting cowled fan are each coupled to the helicopter by a pivot axis and a pivot motor which allows the fanes to be aim directly forward, directly down, or any angle in between.

16 Claims, 4 Drawing Sheets

FIREFIGHTING HELICOPTER FANS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fire fighting equipment, more specifically, a firefighting helicopter fans.

Wildland fires may cover a large area and may be difficult to control if there is a prevailing wind. The prevailing wind may blow the flames and embers towards unburned material, which rapidly become involved in the fire.

SUMMARY OF INVENTION

The firefighting helicopter fans comprise a left pivoting cowled fan and a right pivoting cowled fan mounted onto the sides of a helicopter. The fans may be used to create an airstream, which counters the prevailing wind and/or blows flames and embers away from unburned materials. The fans are each protected by a cowl that surrounds the blades to protect the blades an direct the airstream. The left pivoting cowled fan and the right pivoting cowled fan are each coupled to the helicopter by a pivot axis and a pivot motor which allows the fanes to be aim directly forward, directly down, or any angle in between.

An object of the invention is to provide a pair of fans on the side of a helicopter for use in fighting a wildland fire.

Another object of the invention is to allow the fans to be pivoted so that they can be aimed forward, down, or angles in between.

A further object of the invention is to provide a cowl around each fan to protect the blades of the fan and to direct the airstream created by the fan.

Yet another object of the invention is to provide controls for the fans inside of the helicopter.

These together with additional objects, features and advantages of the firefighting helicopter fans will be readily apparent to those of ordinary skill in the art upon reading the following detailed description of the presently preferred, but nonetheless illustrative, embodiments when taken in conjunction with the accompanying drawings.

In this respect, before explaining the current embodiments of the firefighting helicopter fans in detail, it is to be understood that the firefighting helicopter fans is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the firefighting helicopter fans.

It is therefore important that the claims be regarded as including such equivalent construction insofar as they do not depart from the spirit and scope of the firefighting helicopter fans. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
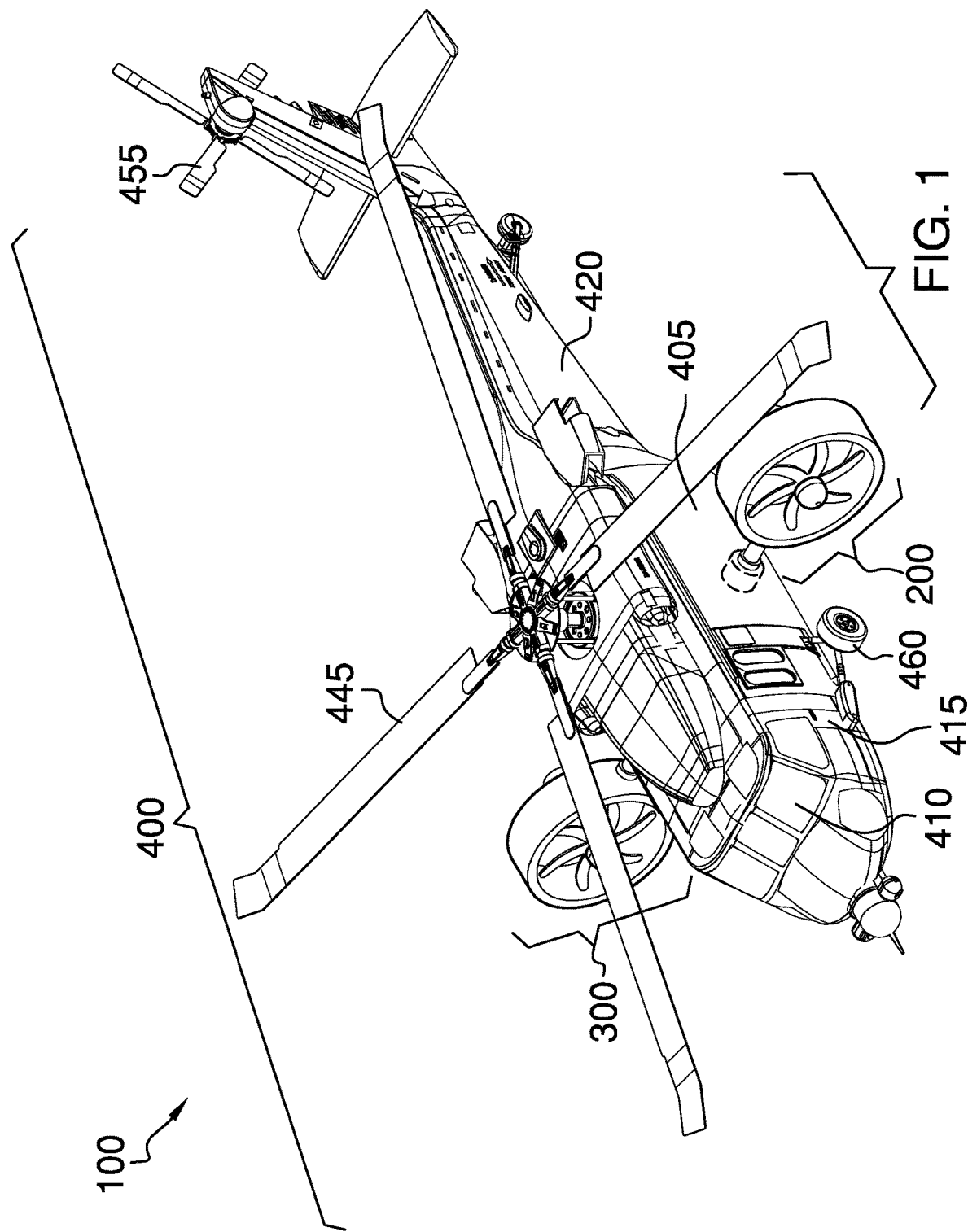
FIG. 1 is a perspective view of an embodiment of the disclosure.
Figure 2:
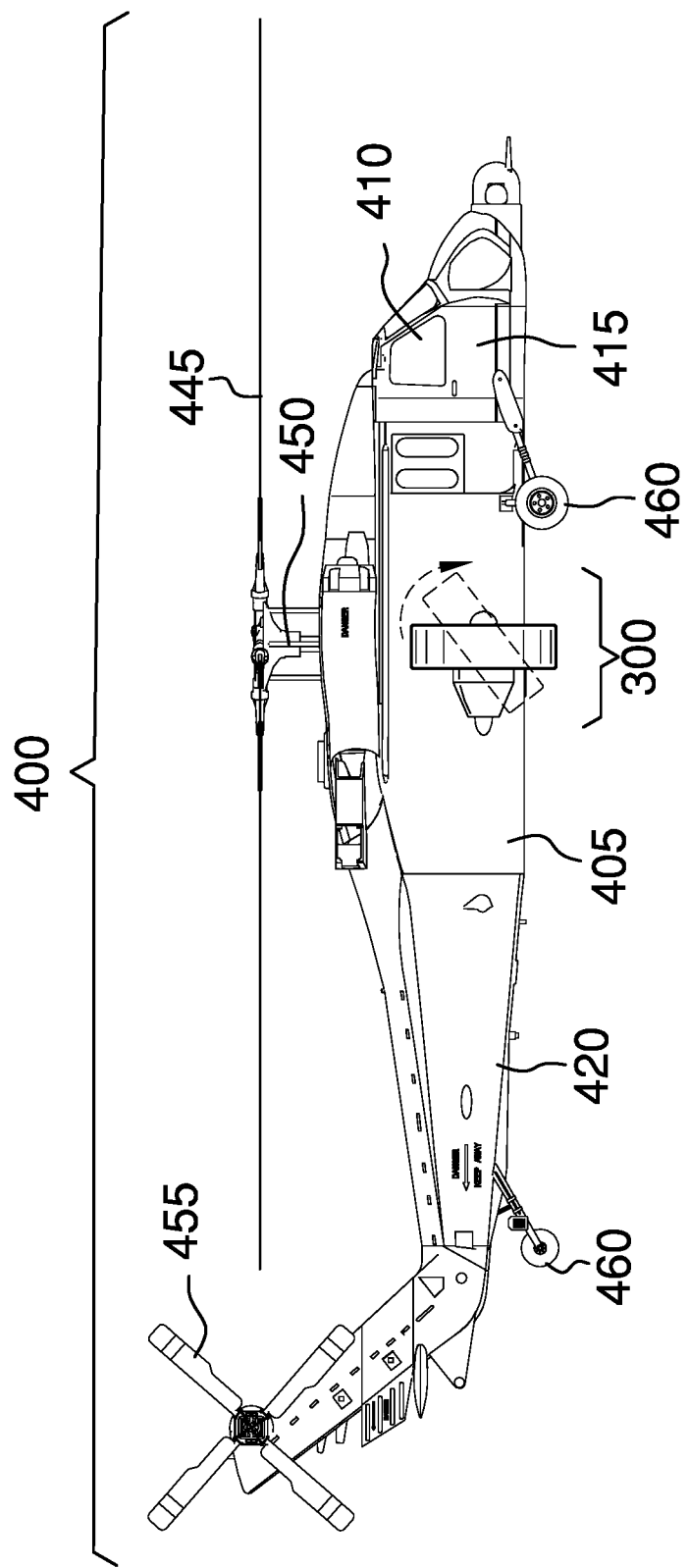
FIG. 2 is a side view of an embodiment of the disclosure.
Figure 3:
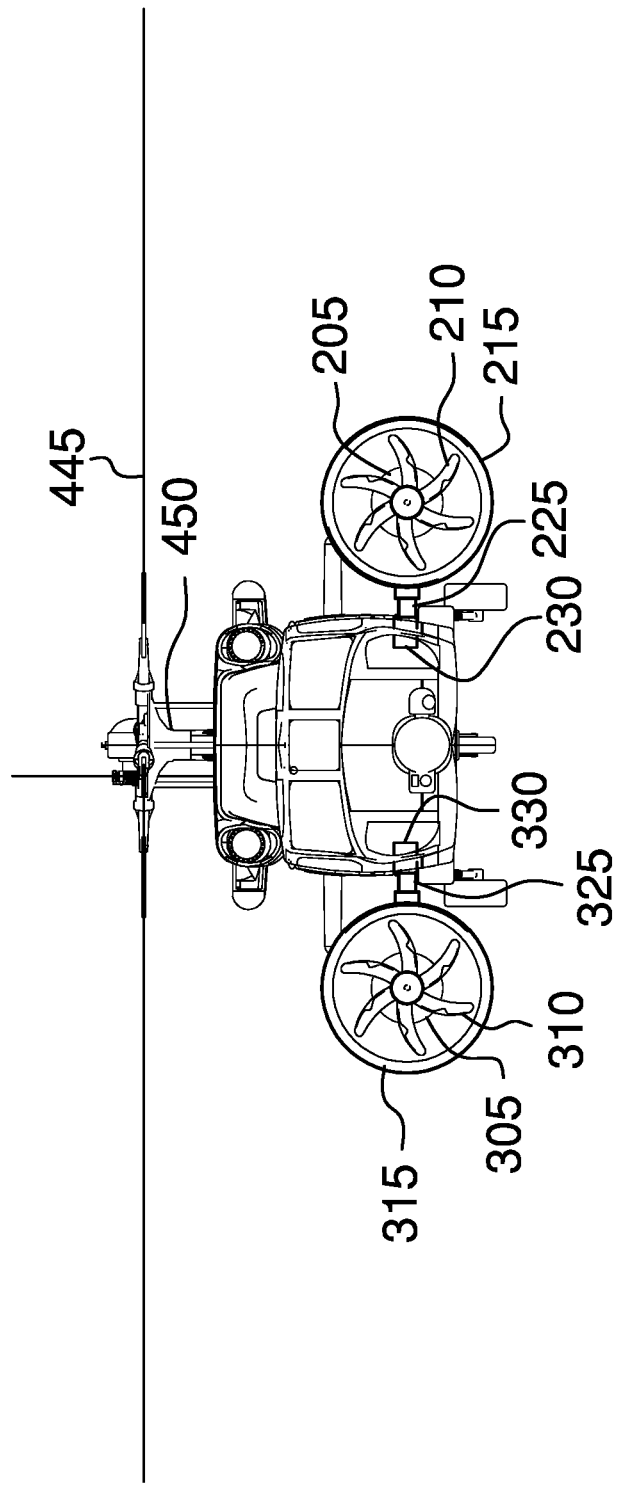
FIG. 3 is a front view of an embodiment of the disclosure.
Figure 4:
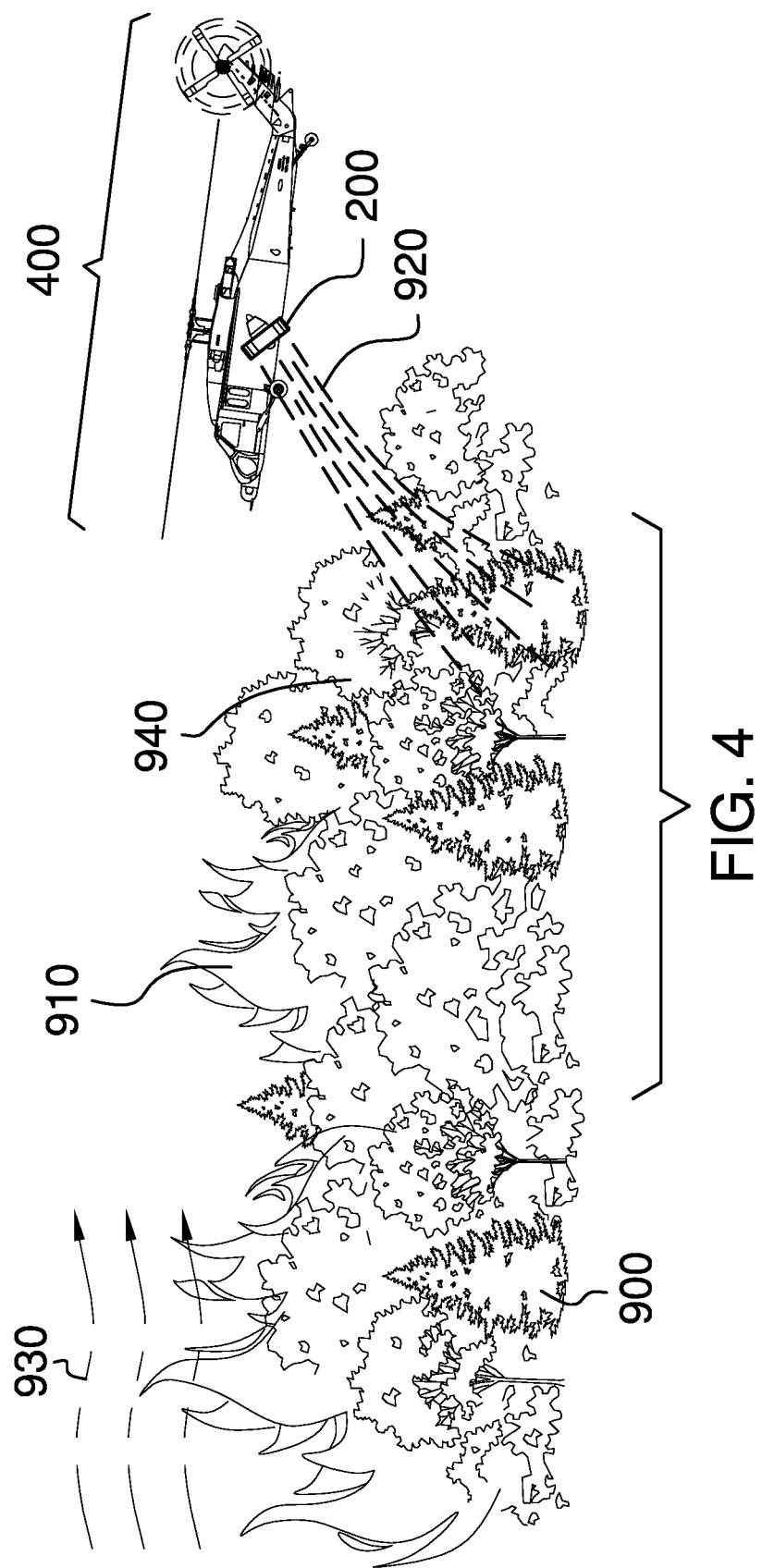
FIG. 4 is an in-use view of an embodiment of the disclosure.

Detailed reference will now be made to a first potential embodiment of the disclosure, which is illustrated in FIGS. 1 through 4.

The firefighting helicopter fans 100 (hereinafter invention) comprises a helicopter 400, a left pivoting cowled fan 200, and a right pivoting cowled fan 300. The invention 100 may be an aerial platform for fighting a fire 910. The invention may direct an airstream 920 into the fire 910 burning in a wildland 900. The airstream 920 may counter a prevailing wind 930 and/or may push the fire 910 away from unburned material 940.

The helicopter 400 may be a heavier-than-air aircraft that is able to take off and land vertically, to hover in a stationary position, and to fly forward, backward, and laterally. The helicopter 400 may be adapted to mount the left pivoting cowled fan 200 and the right pivoting cowled fan 300 on the left and right sides of the helicopter 400, respectively.

The left pivoting cowled fan 200 may be a device for producing the airstream 920 from the left side of the helicopter 400. The left pivoting cowled fan 200 may comprise a left fan motor 205, left fan blades 210, a left cowl

215, a plurality of left motor support struts (not illustrated in the figures), a left pivot axis 225, and a left pivot motor 230.

The left fan motor 205 may be used to rotate the left fan blades 210. The direction of rotation of the left fan blades 210 may be such that the left fan blades 210 suck the airstream 920 into the rear side of the left cowl 215 and blow the airstream 920 out of the front of the left cowl 215.

The left fan motor 205 may be suspended at the center of the left cowl 215 using the plurality of left motor support struts that run from the left cowl 215 to the left fan motor 205.

The left cowl 215 may be a shroud surrounding the left fan blades 210. The left cowl 215 may protect the left fan blades 210 from damage and may direct the airstream 920 through the left pivoting cowled fan 200. The left cowl 215 may be coupled to the outer end of the left pivot axis 225.

The inner end of the left pivot axis 225 may be coupled to the left pivot motor 230. The left pivot motor 230 may be coupled to left side of the helicopter 400. The left pivoting cowled fan 200 may be pivoted to direct the airstream 920 at angles between straight forward and straight downward by activating the left pivot motor 230 to pivot the left pivot axis 225.

A left fan fuel line (not illustrated in the figures) and left fan electrical wiring (not illustrated in the figures) may be routed from the helicopter 400 along the left pivot axis 225, the left cowl 215, and the plurality of left motor support struts to the left fan motor 205. This includes the use of slack, strain relief, and guides where necessary to bridge across a pivoting coupling.

The right pivoting cowled fan 300 may be a device for producing the airstream 920 from the right side of the helicopter 400. The right pivoting cowled fan 300 may comprise a right fan motor 305, right fan blades 310, a right cowl 315, a plurality of right motor support struts (not illustrated in the figures), a right pivot axis 325, and a right pivot motor 330.

The right fan motor 305 may be used to rotate the right fan blades 310. The direction of rotation of the right fan blades 310 may be such that the right fan blades 310 suck the airstream 920 into the rear side of the right cowl 315 and blow the airstream 920 out of the front of the right cowl 315.

The right fan motor 305 may be suspended at the center of the right cowl 315 using the plurality of right motor support struts that run from the right cowl 315 to the right fan motor 305.

The right cowl 315 may be a shroud surrounding the right fan blades 310. The right cowl 315 may protect the right fan blades 310 from damage and may direct the airstream 920 through the right pivoting cowled fan 300. The right cowl 315 may be coupled to the outer end of the right pivot axis 325.

The inner end of the right pivot axis 325 may be coupled to the right pivot motor 330. The right pivot motor 330 may be coupled to right side of the helicopter 400. The right pivoting cowled fan 300 may be pivoted to direct the airstream 920 at angles between straight forward and straight downward by activating the right pivot motor 330 to pivot the right pivot axis 325.

A right fan fuel line (not illustrated in the figures) and right fan electrical wiring (not illustrated in the figures) may be routed from the helicopter 400 along the right pivot axis 325, the right cowl 315, and the plurality of right motor support struts to the right fan motor 305. This includes the use of slack, strain relief, and guides where necessary to bridge across a pivoting coupling.

The right fan fuel line and the left fan fuel line may be supplied with fuel from a fuel storage tank (not illustrated in the figures) located within a fuselage 405 of the helicopter 400.

The on/off state and rotational speed of the left pivoting cowled fan 200 and the right pivoting cowled fan 300 may be determined by one or more fan speed controls (not illustrated in the figures) located within the fuselage 405 of the helicopter 400. In some embodiments, the one or more fan speed controls may be located in a cockpit 410. In some embodiments, the right pivoting cowled fan 300 and the left pivoting cowled fan 200 may be controlled separately.

The helicopter 400 may comprise the fuselage 405, an engine (not illustrated in the figures), a transmission (not illustrated in the figures), the fuel storage tank, a main rotor blade 445, a tail rotor 455, and landing gear 460. The main rotor blade 445 may be an assembly of one or more rotary wings that provide lift and thrust for the helicopter 400. The main rotor blade 445 may rotate in a horizontal plane above the helicopter 400 and may be tilted to control the direction of movement. The main rotor blade 445 may be coupled to the transmission via a rotor mast 450.

The tail rotor 455 may be a vertically oriented rotor at the rear of the helicopter 400. The tail rotor 455 may counter the torque produced by the main rotor blade 445 and may control yaw of the helicopter 400. The tail rotor 455 may be mounted on a tail boom 420 at the rear of the fuselage 405 to increase the horizontal separation between the main rotor blade 445 and the tail rotor 455.

The engine may produce the rotary motion that drives the main rotor blade 445 and other systems. In some embodiments, the engine may be a turbine engine. The transmission may transfer and distribute the rotary motion produced by the engine to the main rotor blade 445 and the tail rotor 455. In some embodiments, the transmission may be an electromagnetic transmission.

The fuselage 405 may be a compartment that is adapted for carrying a flight crew, passengers, cargo, and equipment. The frontmost portion of the fuselage 405 may comprise the cockpit 410 where pilot controls (not illustrated in the figures) are located. The fuselage 405 may comprise one or more cabin doors 415 for entry and exit. The landing gear 460 may be a support structure located under the helicopter 400. The landing gear 460 may support the weight of the helicopter 400 when the helicopter 400 is on the ground. The landing gear 460 may be a plurality of wheels, a pair of skids, or a combination thereof.

As used in this disclosure, a "blade" is a term that is used to describe a wide and flat structure or portion of a larger structure. Non-limiting examples of object which are or which comprise blades may include a knife, a propeller, a shovel, or a cutting edge of a tool.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, an "engine" is a device with moving parts that is used to convert energy into rotational or linear motion.

As used in this disclosure, a "fan" is a mechanical device with rotating blades that is used to create a flow or current of air.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "lateral" refers to the sides of an object or movement towards a side. Lateral directions are generally perpendicular to longitudinal directions. "Laterally" refers to movement in a lateral direction.

As used in this disclosure, a "motor" refers to a device that transforms energy from an external power source into mechanical energy.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "transmission" is a device that transmits the energy of motion from a first location to a second location.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

As used in this disclosure, the term "yaw" refers to the rotation or oscillation of a vehicle around the perpendicular axis of a vehicle. The perpendicular axis is defined as the axis that: 1) is perpendicular to the roll axis; and, 2) perpendicular to the pitch axis. The perpendicular axis is also commonly referred to as the yaw axis. More colloquially, yaw would be referred to as a spin.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A firefighting helicopter system comprising:
a helicopter, a left pivoting cowled fan, and a right pivoting cowled fan;
wherein the firefighting helicopter system is an aerial platform for fighting a fire;
wherein the firefighting helicopter system directs an airstream into the fire burning in a wildland;
wherein the airstream counters a prevailing wind and/or pushes the fire away from unburned material;
wherein the helicopter is a heavier-than-air aircraft that is able to take off and land vertically, to hover in a stationary position, and to fly forward, backward, and laterally;
wherein the helicopter is adapted to mount the left pivoting cowled fan and the right pivoting cowled fan on the left and right sides of the helicopter, respectively;
wherein the left pivoting cowled fan is a device for producing the airstream from the left side of the helicopter;
wherein the left pivoting cowled fan comprises a left fan motor, left fan blades, a left cowl, a plurality of left motor support struts, a left pivot axis, and a left pivot motor;
wherein a left fan fuel line and left fan electrical wiring are routed from the helicopter along the left pivot axis, the left cowl, and the plurality of left motor support struts to the left fan motor.

2. The firefighting helicopter system according to claim 1,
wherein the left fan motor rotates the left fan blades;
wherein the direction of rotation of the left fan blades is such that the left fan blades suck the airstream into the rear side of the left cowl and blow the airstream out of the front of the left cowl.

3. The firefighting helicopter system according to claim 2
wherein the left fan motor is suspended at the center of the left cowl using the plurality of left motor support struts that run from the left cowl to the left fan motor.

4. The firefighting helicopter system according to claim 3
wherein the left cowl is a shroud surrounding the left fan blades;
wherein the left cowl protects the left fan blades from damage and directs the airstream through the left pivoting cowled fan;
wherein the left cowl is coupled to the outer end of the left pivot axis.

5. The firefighting helicopter system according to claim 4
wherein the inner end of the left pivot axis is coupled to the left pivot motor;
wherein the left pivot motor is coupled to left side of the helicopter;
wherein the left pivoting cowled fan pivots to direct the airstream at angles between straight forward and straight downward by activating the left pivot motor to pivot the left pivot axis.

6. The firefighting helicopter system according to claim 5
wherein the right pivoting cowled fan is a device for producing the airstream from the right side of the helicopter;
wherein the right pivoting cowled fan comprises a right fan motor, right fan blades, a right cowl, a plurality of right motor support struts, a right pivot axis, and a right pivot motor.

7. The firefighting helicopter system according to claim 6
wherein the right fan motor rotates the right fan blades;
wherein the direction of rotation of the right fan blades is such that the right fan blades suck the airstream into the rear side of the right cowl and blow the airstream out of the front of the right cowl.

8. The firefighting helicopter system according to claim 7 wherein the right fan motor is suspended at the center of the right cowl using the plurality of right motor support struts that run from the right cowl to the right fan motor.

9. The firefighting helicopter system according to claim 8 wherein the right cowl is a shroud surrounding the right fan blades;
wherein the right cowl protects the right fan blades from damage and directs the airstream through the right pivoting cowled fan;
wherein the right cowl is coupled to the outer end of the right pivot axis.

10. The firefighting helicopter system according to claim 9
wherein the inner end of the right pivot axis is coupled to the right pivot motor;
wherein the right pivot motor is coupled to right side of the helicopter;
wherein the right pivoting cowled fan pivots to direct the airstream at angles between straight forward and straight downward by activating the right pivot motor to pivot the right pivot axis.

11. The firefighting helicopter system according to claim 10
wherein a right fan fuel line and right fan electrical wiring are routed from the helicopter along the right pivot axis, the right cowl, and the plurality of right motor support struts to the right fan motor.

12. The firefighting helicopter system according to claim 11
wherein the right fan fuel line and the left fan fuel line are supplied with fuel from a fuel storage tank located within a fuselage of the helicopter;
wherein the on/off state and rotational speed of the left pivoting cowled fan and the right pivoting cowled fan are determined by one or more fan speed controls located within the fuselage of the helicopter.

13. The firefighting helicopter system according to claim 12
wherein the right pivoting cowled fan and the left pivoting cowled fan are controlled separately.

14. The firefighting helicopter system according to claim 12
wherein the helicopter comprises the fuselage, an engine, a transmission, the fuel storage tank, a main rotor blade, a tail rotor, and landing gear;
wherein the main rotor blade is an assembly of one or more rotary wings that provide lift and thrust for the helicopter;
wherein the main rotor blade rotates in a horizontal plane above the helicopter and is tilted to control the direction of movement;
wherein the main rotor blade is coupled to the transmission via a rotor mast.

15. The firefighting helicopter system according to claim 14
wherein the tail rotor is a vertically oriented rotor at the rear of the helicopter;
wherein the tail rotor counters the torque produced by the main rotor blade and controls yaw of the helicopter;
wherein the tail rotor is mounted on a tail boom at the rear of the fuselage to increase the horizontal separation between the main rotor blade and the tail rotor;
wherein the engine produces the rotary motion that drives the main rotor blade and other systems;
wherein the transmission transfers and distributes the rotary motion produced by the engine to the main rotor blade and the tail rotor.

16. The firefighting helicopter system according to claim 15
wherein the fuselage is a compartment that is adapted for carrying a flight crew, passengers, cargo, and equipment;
wherein the frontmost portion of the fuselage comprises a cockpit where pilot controls are located;
wherein the fuselage comprises one or more cabin doors for entry and exit;
wherein the landing gear is a support structure located under the helicopter;
wherein the landing gear supports the weight of the helicopter when the helicopter is on the ground;
wherein the landing gear is a plurality of wheels, a pair of skids, or a combination thereof.

* * * * *